Aug. 31, 1965  H. S. SHAW  3,203,536
CORNERING ROLLER FOR BELTS
Filed Sept. 11, 1961  3 Sheets-Sheet 1

INVENTOR.
HERBERT S. SHAW
BY
Knox & Knox

Aug. 31, 1965     H. S. SHAW     3,203,536
CORNERING ROLLER FOR BELTS
Filed Sept. 11, 1961     3 Sheets-Sheet 2

*INVENTOR.*
HERBERT S. SHAW
BY
*Knox & Knox*

Aug. 31, 1965

H. S. SHAW 3,203,536

CORNERING ROLLER FOR BELTS

Filed Sept. 11, 1961

INVENTOR.
HERBERT S. SHAW
BY
Knox & Knox

United States Patent Office 3,203,536
Patented Aug. 31, 1965

3,203,536
CORNERING ROLLER FOR BELTS
Herbert S. Shaw, La Mesa, Calif.
(1526 Rideout Way, Whittier, Calif.)
Filed Sept. 11, 1961, Ser. No. 137,349
9 Claims. (Cl. 198—184)

This invention relates to conveyer belts, and more particularly to apparatus that guides conveyer belts around corners.

Background

Conveyer belts are widely used to transfer articles or packages from one level to another, or horizontally from one location to another. These conveyers generally take the form of endless belts that have a flat upper surface on to which is deposited the article or package to be transported.

Very often it is necessary that these conveyer belts change their direction because of limitations imposed by building construction, placement of machines or departments, or the like.

As may be realized, directing a wide flat belt around a corner poses problems and many cornering devices have been suggested.

One of the greatest problems produced by cornering, is the inherent tendency of the conveyer belt to creep toward the inner portion of the cornering device.

Most of the prior-art cornering devices have sought to prevent this creeping, by using the tension of the conveyer belt itself as the limiting factor. Unfortunately, this strains the belt, the guides, and shortens their useful life. Other attempts to overcome creepage employed edge rollers, and permitted the belt to engage these rollers. This approach put a strain and abraded the edge of the belt which represents a completely unsatisfactory solution.

Objects and drawings

It is therefore the principal object of my invention to provide an improved cornering device for a conveyer belt.

It is another object of my invention to provide a conveyer belt cornering device that does not strain the belt, or increase the tension therein.

It is a further object of my invention to provide a conveyer belt cornering device that does not strain or abrade the edge of the belt.

It is a still further object of my invention to provide a conveyer belt cornering device that easily and gently transports objects on the belt around corners without subjecting the belt to any undue distortions.

The attainment of these objects and others will be realized from the following specification taken in conjunction with the drawings, in which.

Brief description of the invention

Broadly stated, my invention contemplates a belt cornering assemblying employing a pair of rollers that comprise a plurality of wheels. These wheels are positioned at such an angle, and rotate in such a manner, that they minimize the tendency of the belt to creep as it traverses a corner and my invention includes, besides cornering and take-up rollers, correcting rollers which compensate for creep.

The wheels may be of the type that have a common shaft; of the type that rotates individually about a common shaft; of the type that have individual shafts; or of any other type that provides the desired effect. Various embodiments and the principles of my invention will be shown and explained.

Detailed description of the invention

Figure 1:
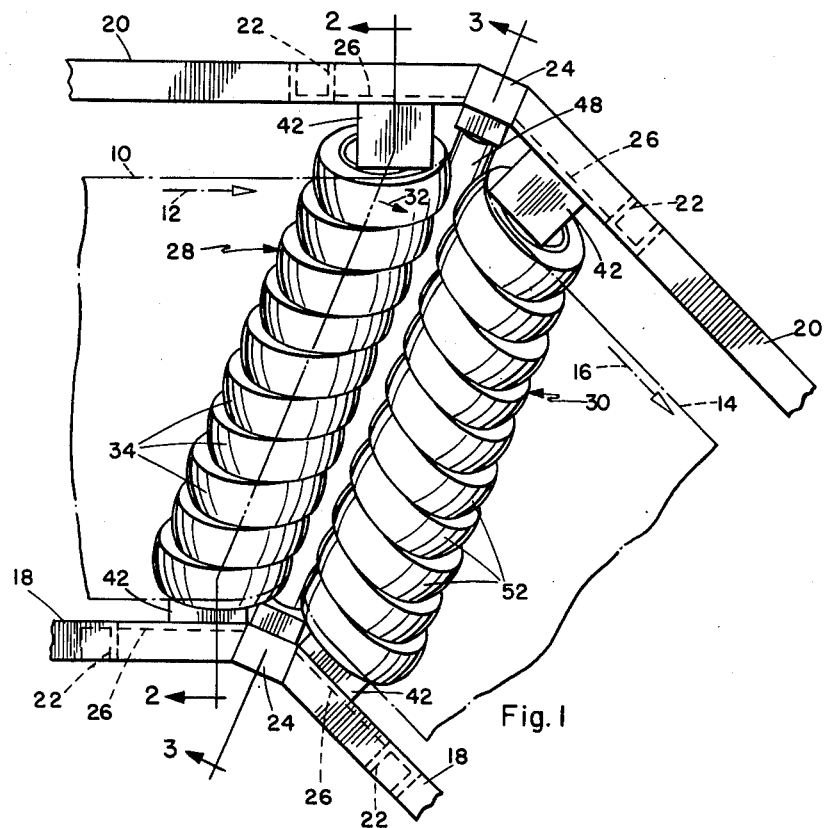
FIGURE 1 is a top plan view of a corner roller assembly.

Referring now to FIGURE 1, there is shown an incoming course 10 of an endless conveyer belt, that is travelling in a given direction as indicated by directional arrow 12. It is desired that the outgoing course 14 of the conveyer belt travel in the direction of arrow 16. For convenience of explanation, it will be assumed that the belt is to move through an angle of 45 degrees; although the use of this particular angle should not be construed as a limitation. Generally speaking, it has been found that the cornering roller system should be placed adjacent a plane bisecting the angle of change of direction. Thus, if the conveyer belt is to change its direction of movement 45 degrees, the cornering rollers should be at an angle of 22½ degrees to the adjacent reaches or courses of the belts.

The conveyer belt supporting structure may take any convenient form, one of which has an inner rail 18 and an outer rail 20, between which are mounted the various idler rollers that support and/or drive the belt. These rails may be supported by conveniently spaced uprights, such as 22, and corner uprights 24 may be located to provide additional strength at the cornering location.

In order to more clearly understand the creepage problem, assume for the moment that cornering rollers 28 and 30 are of the prior-art solid unitary type. Since they are mounted at an angle of 22½ degrees to the movement of incoming course 10, the upper surface of the roller would be moving perpendicularly to the axis of the roller; that is, in the direction of arrow 32. Thus, the upper surface of roller 28 would cause the incoming course of conveyor 10 to gradually creep to the lower edge of the roller 28.

This creeping is obviated by my invention in the following manner.

Instead of using a solid unitary roller, my roller 28 comprises a plurality of roller wheels 34 mounted on a rectilinear shaft that is positioned at about 22½ degrees to the belt's direction of movement. Moreover, each roller wheel 34 is canted at an angle of approximately 22½ degrees to the vertical, as shown in FIGURE 2.

Figure 2:
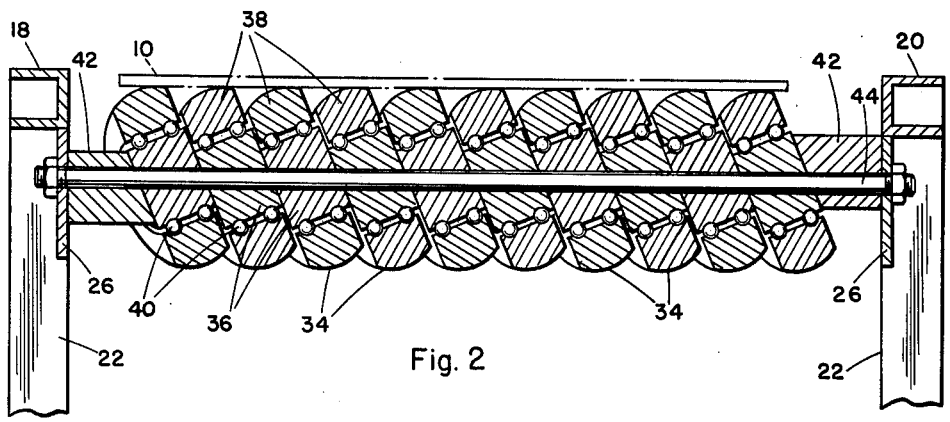
FIGURE 2 is an enlarged sectional view taken on line 2—2 of FIGURE 1.

This result may be achieved in a number of ways, FIGURE 2 showing a roller wheel 34 having a central portion 36 that has a rotatable ring 38 that revolves around the center portion by means of roller bearings 40, or the like. The central portion 36 is slightly wider than the ring portion 38; and the central portions of a plurality of roller wheels are clamped together by means of positioning blocks 42 and an end-threaded rod 44 that fastens to mounting plates 26.

The positioning blocks are shaped to fit flush against the mounting plates, and having inclined faces to position the roller wheels at the desired angle.

In FIGURE 2, conveyer belt 10 is moving toward the viewer and since the lower surface of the belt and the uppermost portion of the roller wheels are in contact, these portions of the wheels are moving in the same direction as the belt movement.

Since the roller wheels are inclined to the left as illustrated and the roller axis also is inclined, the belt moves and the roller wheels rotate in substantially the same direction. Thus, there is no tendency of the belt to creep toward the roller edge as in prior art devices.

Each wheel of FIGURE 2 is free to rotate individually, so each supports and guides the portion of the belt directly above it.

In this way, my invention overcomes the creepage tendency of the conveyer belt.

It is evident from FIGURE 1, that due to the canting of the corner roller 28, the near side of incoming course 10 reaches the roller before the corresponding far side of the conveyer belt. The near side therefore drops into the space between the rollers before the corresponding far side, thus producing the skewed effect shown in FIGURE 3.

In order to provide sufficient friction between the underside of the conveyor belt and the upper surface of the roller wheels, a slack take-up roller 48 is positioned at the bottom of the loop 50 of the conveyor belt. Take up roller 48 is positioned transverse to the belt, and is therefore positioned at an angle as shown in FIGURE 3.

Figure 3:
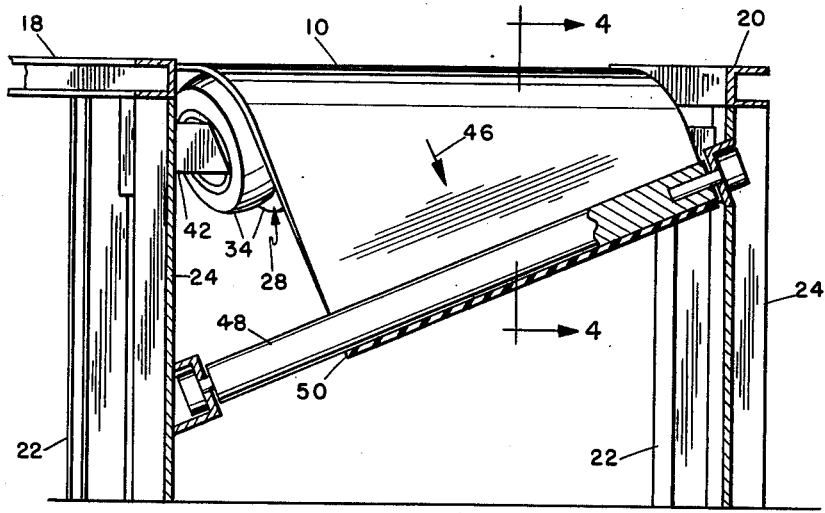
FIGURE 3 is a sectional view taken on line 3—3 of FIGURE 1.

FIGURE 3 shows that the angle of the roller and the angle of the wheels cause the surface of roller wheels 34, where contact is made with the belt, to move in substantially the same direction as the belt 10. Thus, in another way of looking at the structure, it may be considered that the roller wheels do not produce the component that caused belt creepage in prior-art structures.

The cornering of the conveyer belt is completed by causing it to travel over the second cornering roller 30, which is similar to the first roller 28 previously described. The main difference is that the roller wheels 52 of the second roller 30 are canted in the opposite direction. This opositely directed canting of the roller wheels is also shown by the relative positions of threaded rods 44 and 54 in FIGURE 4. As a result, belt movement and roller wheel rotation continue in the same direction and a force causing the belt to creep toward the roller edge is not created.

As the exit course 14 leaves the second cornering roller 30, the conveyor belt is coplanar with the uppermost surface of the roller wheels 52, and is moving in the direction of arrow 16 at the desired angle of 45 degrees with relation to its incoming direction as indicated by arrow 12.

Figure 4:
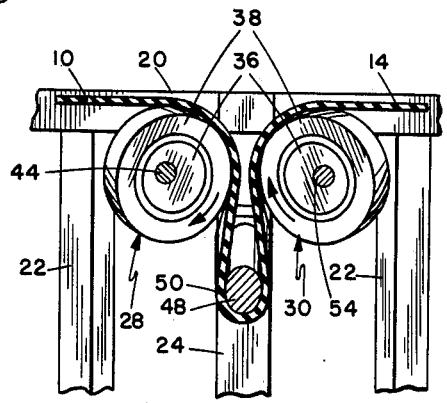
FIGURE 4 is a sectional view taken on line 4—4 of FIGURE 3.

As shown in FIGURES 1 and 4, the cornering rollers 28 and 30 are parallel, closely spaced, and in the majority of installations at the same level. This close spatial relation assures that packages and like being conveyed are readily shifted from incoming course 10 to outgoing course 14 with a minimum amount of bouncing or danger of falling into the gap between the rollers.

Figure 5:
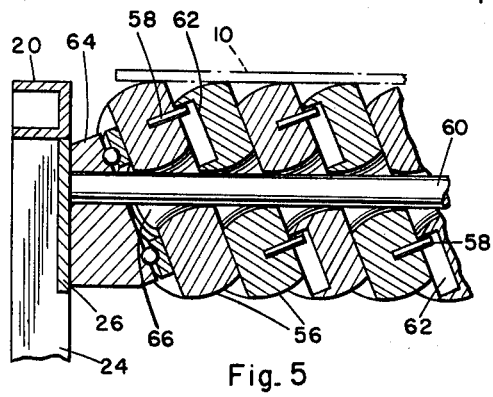
FIGURE 5 is a sectional view similar to FIGURE 2, showing a modified roller structure.

FIGURE 5 shows another embodiment of my invention, wherein unitary roller wheels 56 are used. Here each roller wheel has a driving pin 58 having one end embedded in the wheel, the other end of the driving pin being used to drive the adjacent roller wheel. Since the pin changes its distance from shaft 60, the driven roller wheel has a radial slot 62 therein. In this way driving pin 58 always transmits a rotational force to its adjacent wheel, regardless of the radial relationship of the pin.

In the embodiment of FIGURE 5, a thrust bearing 64 is used to position and hold the roller wheel 56 at their desired angle. The pivot hole 66 of each roller wheel takes an hour glass form to permit free rotation of the canted wheel about shaft 60.

The arrangement of FIGURE 5 assures that all the wheels operate as a unit, and the wheels of this embodiment may therefore be driven, if desired.

Figure 6:
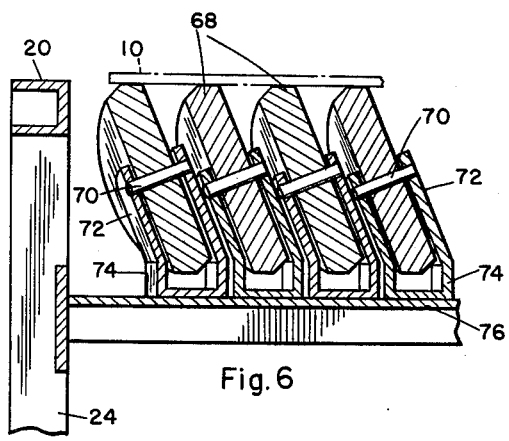
FIGURE 6 is a sectional view showing a further modified roller structure.

In FIGURE 6, I show an embodiment wherein each roller wheel 68 is individually mounted. To achieve this, each wheel has its own shaft 70 positioned at the desired angle by individual yokes 72; the yoke being fastened to the upright by any convenient means, such as a bracket 74 and a mounting plate 76.

This embodiment permits each wheel to act in an individual manner and to be individually replaceable when required.

It has thus been shown how my invention permits a flat conveyer belt to traverse a corner without creepage.

Since, as previously indicated, the conveyer belts are continuous, at the end of their run the belts must be passed around an end roller, so that the belt may travel back to its starting point. Frequently the returning belt is used to transport objects in the opposite direction.

Generally speaking, the return belt traverses the same path as the outgoing belt, in order to be able to use the same supporting structure, inner and outer rails, cornering posts, and the like.

Figure 7:
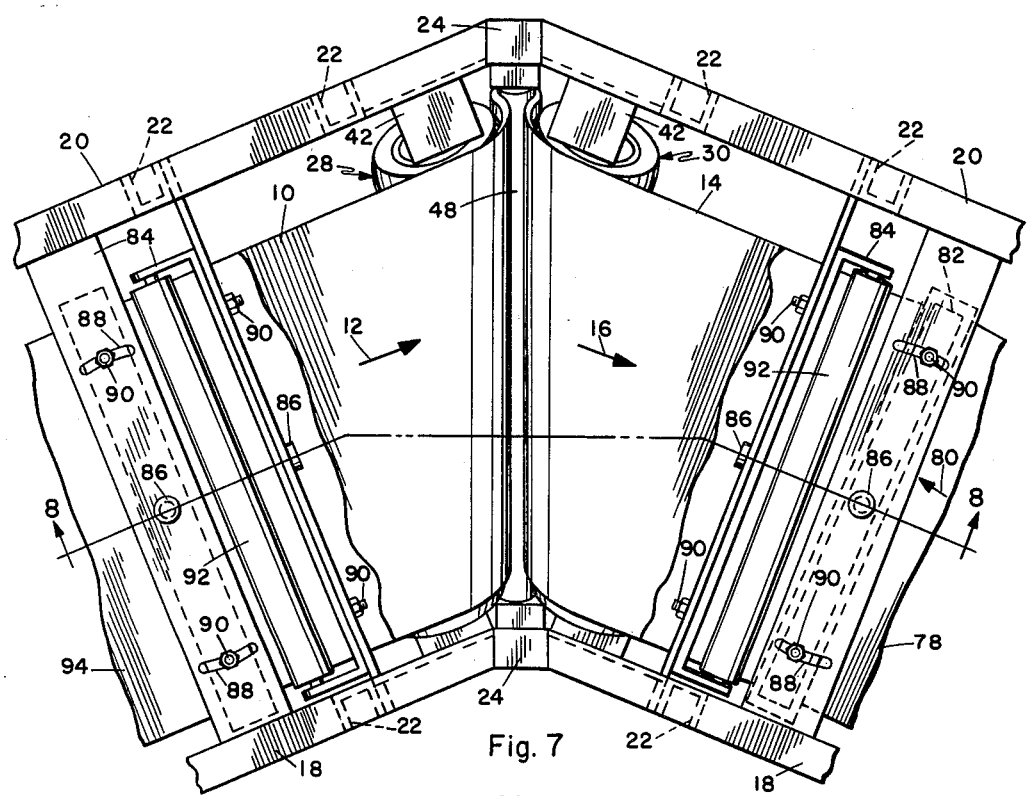
FIGURE 7 is a cutaway top view of a corner roller assembly including a showing of the return conveyer belt.

Unfortunately, it is often impossible for the return belt to precisely "track" the outgoing belt; creepage correction means is often necessary, especially when the return run of the belt approaches the cornering structure at a different angle from the outgoing belt, a condition which always exists in some degree due to the infeasibility of precise construction, and which may be quite considerable in some installations. This condition is shown in FIGURE 7 where the incoming course 78 of the return belt is shown approaching the cornering device at an exaggerated angle, as indicated by arrow 80.

In order to correct the mis-alignment, a pair of correcting rollers are used. The first of these, 82, is a horizontal correcting roller that pivots in a horizontal plane. This result may be achieved by mounting roller 82 on a supporting yoke 84 that has a pivot pin 86 at its center, two arcuate slots 88, and two locking devices 90. Yoke 84 may thus be positioned and locked in its optimum position.

A second correcting roller 92, is similarly mounted to pivot in a vertical direction, should additional correction be necessary.

Incoming course 78 of the return belt may thus be caused to approach the cornering device at the proper angle and position. It will, of course, be realized that the actual mis-alignment will generally be quite minor, in the order of a couple of degrees.

Figure 8:
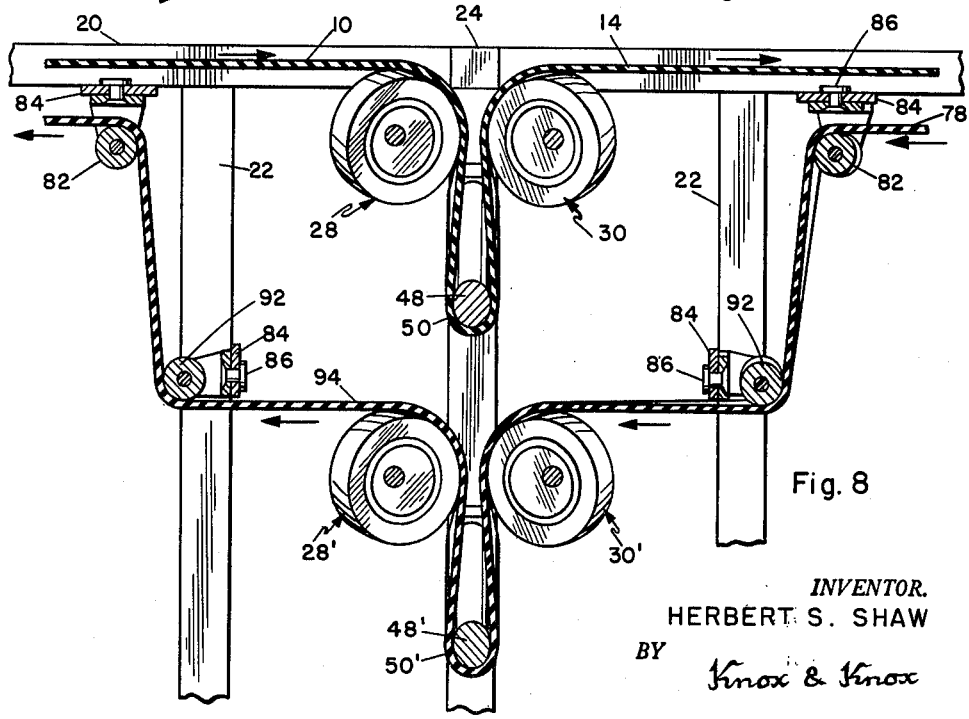
FIGURE 8 is a sectional view taken on line 8—8 of FIGURE 7.

Once incoming course 78 is properly aligned, it traverses a cornering device similar to the one previously described. This may be positioned at a lower level as shown in FIGURE 8, and comprises cornering rollers 28' and 30', and an idler roller 48'. The return belt forms a loop 50' in the manner previously explained.

Due to mechanical positioning, assembly, manufacturing tolerances, and the like, the exit course 94 of the return belt may be also mis-aligned with respect to the incoming course 10 of the forward moving conveyer belt. If this mis-alignment is serious enough to warrant correction, a set of horizontal and vertical correcting rollers may be used as described above. In this way both the outgoing and returning portions of the conveyer belt may traverse desired curves, corners, and angles, and be kept in tracking relation with each other at all times.

Advantages

It will now be evident that my invention has a decided advantage over prior-art cornering devices for conveyer belts. My disclosed structure obviates the creepage problem, avoids undue straining of the belt and abrasion of the edges thereof. It is simple, long-lived, and does not require any particular maintenance. Moreover, my cornering rollers may be readily substituted in existing systems for the less satisfactory ones in current use. Of the various embodiments shown, the one that is most suitable for a given installation may be used.

It is understood that minor variation from the form of the invention disclosed herein may be made without departure from the spirit and scope of the invention, and that the specification and drawing are to be considered as merely illustrative rather than limiting.

I claim:

1. A roller for a cornering device, said roller having a plurality of roller wheels in side by side arrangement along the rectilinear axis of the roller; and means for mounting said wheels inclined to the axis of said roller.

2. A roller for a cornering device, said roller having a plurality of roller wheels in side by side arrangement along the rectilinear axis of the roller; and means for mounting each said wheel at the same given inclination with respect to the axis of said roller.

3. The combination of claim 2 including means for mounting each said wheel on its own individual shaft.

4. The combination of claim 2 wherein said wheels each comprise a central portion and a ring portion rotatable about said central portion;
   a rectilinear central shaft extending through said central portions of the wheels; and
   positioning blocks having inclined faces, said blocks being positioned adjacent each end of said shaft, said central portions of the wheels being clamped between said inclined faces of said positioning blocks and thereby held at the same angle to the shaft.

5. The combination of claim 2 wherein selected wheels of said roller have driving pins mounted therein for driving an adjacent wheel of said roller.

6. Apparatus for causing a conveyer belt to traverse a corner, comprising:
   a conveyer belt having an outgoing portion and a return portion each of said portions having an entrance course and an exit course;
   first cornering means for causing the entrance course of said outgoing portion to have a given angular relation to the exit course of said outgoing portion, said first cornering means comprising rollers having a plurality of roller wheels inclined from the roller axis;
   second cornering means for causing the entrance course of said return portion to have a given angular relation to the exit course of said return portion, said second cornering means comprising rollers having a plurality of roller wheels inclined from the roller axis; and
   means for aligning said return portions of said belt with said out going portions, said alignment means comprising a first horizontal correcting roller positioned adjacent the entrance course of said return portion of said belt, a first vertical correcting roller positioned adjacent the entrance course of said return portion of said belt, a second horizontal correcting roller positioned adjacent the exit course of said return portion of said belt, and a second vertical correcting roller positioned adjacent the exit course of said return portion of said belt.

7. Apparatus for causing a conveyer to traverse a corner of a given angle, comprising:
   a conveyor belt having an outgoing portion and a return portion, each said portion having an entrance course and an exit course;
   first cornering means for causing the entrance course of said outgoing portion to have a given angular relation to the exit course of said outgoing portion, said first cornering means comprising a pair of corner rollers positioned with their axis at an angle of substantially half said given angle, said corner rollers comprising a plurality of roller wheels with their axis canted at substantially half said given angle, said first cornering device further comprising a slack take up roller positioned transverse to the direction of movement of said conveyer belt between said corner rollers;
   second cornering means for causing said entrance course of said return portion to have a given angular relation to the exit course of said return portion, said second cornering means comprising a pair of corner rollers positioned with their axis at an angle of substantially half said given angle, said corner rollers comprising a plurality of roller wheels with their axis conted at substantially half said given angle, said first cornering device further comprising a slack take up roller positioned transverse to the direction of movement of said conveyer belt between said corner rollers, said second cornering means being positioned directly below said first cornering means; and
   means for aligning said return portions with said outgoing portions of said belt.

8. Apparatus for causing a conveyer to traverse a corner of a given angle, comprising:
   a conveyor belt having an outgoing portion and a return portion, each said portion having an entrance course and an exit course;
   first cornering means for causing the entrance course of said outgoing portion to have a given angular relation to the exit course of said outgoing portion, said first cornering means comprising a pair of corner rollers positioned with their axis at an angle of substantially half said given angle, said corner rollers comprising a plurality of roller wheels with their axis canted at substantially half said given angle, said first cornering device further comprising a slack take up roller positioned transverse to the direction of movement of said conveyor belt between said corner rollers;
   second cornering means for causing said entrance course of said return portion to have a given angular relation to the exit course of said return portion, said second cornering means comprising a pair of corner rollers positioned with their axis at an angle of substantially half said given angle, said corner rollers comprising a plurality of roller wheels with their axis canted at substantially half said given angle, said first cornering device further comprising a slack take up roller positioned transverse to the direction of movement of said conveyor belt between said corner rollers, said second cornering means positioned directly below said first cornering means; and
   means for aligning said return portions of said belt with said outgoing portions, said alignment means comprising a first horizontal correcting roller positioned adjacent the entrance course of said return portion of said belt, a first verticial correcting roller positioned adjacent the entrance course of said return portion of said belt, a second horizontal correcting roller positioned adjacent the exit course of said return portion of said belt, and a second vertical correcting roller positioned adjacent the exit course of said return portion of said belt.

9. A cornering conveyer belt apparatus, comprising:
   an endless conveyer belt having an outgoing portion and a return portion at a corner to be traversed, each of said portions having an entrance course and an exit course;
   first cornering rollers causing the entrance course of said outgoing portion to have a given angular relation to the exit course of said portion;

second cornering means causing the entrance course of said return portion to have a substantially identical angular relation with the exit course of said return portion; and means perfecting the alignment of the return portion with the outgoing portion comprising a horizontal correcting roller mounted for limited pivotal adjustment about a vertical axis and positioned to deflect said return portion, and a vertical correcting roller mounted for limited pivotal adjustment about a horizontal axis and positioned to further deflect said return portion.

References Cited by the Examiner
UNITED STATES PATENTS

| | | | |
|---|---|---|---|
| 1,255,658 | 2/18 | Stephens | 198—192 |
| 2,128,594 | 8/38 | Rasmussen | 198—184 |
| 2,128,595 | 8/38 | Rasmussen | 198—184 |
| 2,555,765 | 6/51 | Shank. | |
| 2,798,590 | 7/57 | Raskin | 198—184 |
| 2,948,384 | 8/60 | Pate. | |
| 3,029,655 | 4/62 | Morrow | 198—202 X |

SAMUEL F. COLEMAN, *Primary Examiner.*

WILLIAM B. LABORDE, *Examiner.*